(12) United States Patent
Remeika, Jr. et al.

(10) Patent No.: US 11,080,689 B1
(45) Date of Patent: Aug. 3, 2021

(54) SECURE PROCESSING AND TRANSFER OF TOKENS IN A DISTRIBUTED CHAIN DATABASE

(71) Applicant: Harbor Technologies, LLC, Palo Alto, CA (US)

(72) Inventors: Robert Paul Remeika, Jr., Walnut Creek, CA (US); David Oliver Sacks, San Francisco, CA (US); Arisa Amano, San Francisco, CA (US)

(73) Assignee: Harbor Technologies, LLC, Palo Alto, CA (US)

( * ) Notice: Subject to any disclaimer, the term of this patent is extended or adjusted under 35 U.S.C. 154(b) by 293 days.

(21) Appl. No.: 15/812,919

(22) Filed: Nov. 14, 2017

(51) Int. Cl.
  *G06Q 20/38* (2012.01)
  *G06Q 40/04* (2012.01)
  *H04L 29/06* (2006.01)

(52) U.S. Cl.
  CPC .......... *G06Q 20/381* (2013.01); *G06Q 40/04* (2013.01); *H04L 63/10* (2013.01)

(58) Field of Classification Search
  CPC .... G06Q 20/381; G06Q 20/401; G06Q 20/40; G06Q 20/405; G06Q 40/04; H04L 63/10; H04L 67/02; H04L 67/16
  See application file for complete search history.

(56) References Cited

U.S. PATENT DOCUMENTS

| | | | |
|---|---|---|---|
| 8,014,756 B1 * | 9/2011 | Henderson | G06Q 10/103 455/411 |
| 10,375,003 B1 * | 8/2019 | Olsen | H04M 15/705 |
| 2004/0010603 A1 * | 1/2004 | Foster | H04L 63/10 709/229 |
| 2005/0044197 A1 * | 2/2005 | Lai | H04L 67/16 709/223 |
| 2006/0200530 A1 * | 9/2006 | Tokuda | G06F 3/04842 709/206 |

(Continued)

FOREIGN PATENT DOCUMENTS

WO   WO-2012123727 A1 * 9/2012 ......... G06Q 20/3229

OTHER PUBLICATIONS

A. Kurniawan, M. Y. Handeu, B. Alvian and A. A. Renouw, "Information system for depicting relations between banking customer with risk: Study case in Indonesia," 2015, pp. 125-128, doi: 10.1109/ICoICT (Year: 2015).*

(Continued)

*Primary Examiner* — Mamon Obeid
*Assistant Examiner* — Jahed Ali
(74) *Attorney, Agent, or Firm* — Van Pelt, Yi & James LLP

(57) ABSTRACT

Various embodiments of a technique to securely process and transfer a token in a distributed chain database are described herein. The technique includes receiving a valid call to a transfer function to execute a transfer, intercepting the transfer function call and routing a check function to an authorization service that is executed on a chain database, and determining in the authorization service whether the transfer is authorized. The authorization service includes a state that is controlled by a process that is executed off the chain database and returns a value that indicates whether the transfer can proceed. The system then determines whether to validate or invalidate the transfer in response to the returned value.

13 Claims, 14 Drawing Sheets

(56) References Cited

U.S. PATENT DOCUMENTS

| | | | | |
|---|---|---|---|---|
| 2008/0249908 | A1* | 10/2008 | Lorberg | G06Q 40/02 |
| | | | | 705/35 |
| 2009/0125410 | A1* | 5/2009 | Perlman | G06Q 30/0601 |
| | | | | 705/26.1 |
| 2011/0282780 | A1* | 11/2011 | French | G06Q 20/10 |
| | | | | 705/39 |
| 2015/0135279 | A1* | 5/2015 | Hayat | G06Q 20/02 |
| | | | | 726/4 |
| 2016/0104155 | A1* | 4/2016 | McGaugh | G06Q 20/325 |
| | | | | 705/65 |
| 2016/0253663 | A1* | 9/2016 | Clark | G06Q 20/3274 |
| | | | | 705/75 |
| 2017/0140371 | A1* | 5/2017 | Forzley | G06Q 20/065 |
| 2019/0180274 | A1* | 6/2019 | Johnson | G06Q 20/381 |
| 2020/0051067 | A1* | 2/2020 | Overholser | G06F 16/1834 |
| 2020/0167763 | A1* | 5/2020 | Robins | G06Q 20/3678 |

OTHER PUBLICATIONS

X. Liu and P. Zhang, "An Agent Based Anti-Money Laundering System Architecture for Financial Supervision," pp. 5472-5475, doi: 10.1109/WICOM.2007.1340. (Year: 2007).*

ERC20 Token Standard, The Ethereum Wiki, Oct. 27, 2017.

Satoshi Nakamoto, Bitcoin: A Peer-to-Peer Electronic Cash System, May 24, 2009.

Vitalik Buterin, Ethereum White Paper, A Next Generation Smart Contract & Decentralized AP, Nov. 2013.

\* cited by examiner

SECURE PROCESSING AND TRANSFER OF TOKENS IN A DISTRIBUTED CHAIN DATABASE

BACKGROUND OF THE INVENTION

To be of practical use, a token must implement basic functions to enable trading. These include functions for transferring tokens to and from different accounts, making inquiries to determine the token balance at a particular address, and the total supply of tokens. To support trading between different tokens created by different developers, the ERC-20 protocol standard was introduced for use with Ethereum smart contracts. ERC-20 defines a common list of rules and contains basic functions that an Ethereum token has to implement to be compatible. ERC-20 compatible tokens thus speak a common language, allowing developers to create a token exchange system and to add new tokens to a platform that can support trading between different tokens, provided that they comply with the standard. By following the ERC-20 standard, tokens implement the same functions, with the same names, and take the same parameters or arguments resulting in better uniformity, reduced complexity, and enhanced liquidity of tokens. After a token has been minted, possibly following an Initial Coin Offering (ICO), the ERC-20 token standard presents functionality for peer-to-peer transfers and facilitation of transfers via decentralized intermediaries.

Although the ERC-20 protocol includes a transfer function that allows for tokens to be transferred, the transfer process does not currently provide controls of secondary transfers. For example, there is no mechanism for qualification or checking that participants in a transaction are approved or for enforcing restrictions on secondary trading based on applicable securities and tax laws.

BRIEF DESCRIPTION OF THE DRAWINGS

Various embodiments of the invention are disclosed in the following detailed description and the accompanying drawings.

DETAILED DESCRIPTION

Figure 1A:
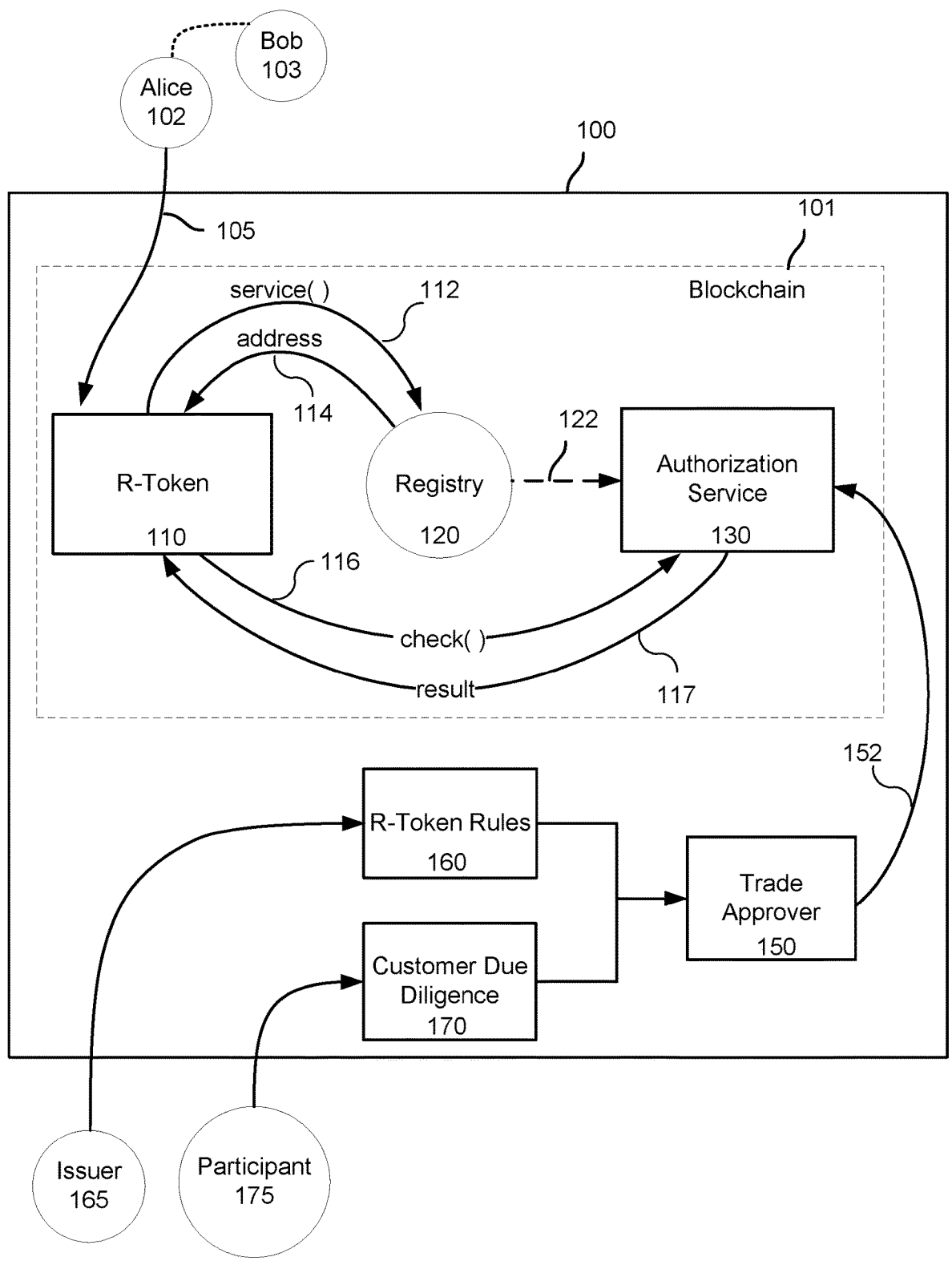
FIG. 1A is a block diagram depicting an exemplary embodiment of a system for securely processing and transferring a token in a distributed chain database.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to securely process and transfer a token in a distributed chain database are described herein. In some embodiments, the technique includes receiving a valid call to a transfer function to execute a transfer, intercepting the transfer function call and routing a check function to an authorization service that is executed on a chain database, and determining in the authorization service whether the transfer is authorized. The authorization service includes a state that is controlled by a process that is executed off the chain database and returns a value that indicates whether the transfer can proceed. The system then determines whether to validate or invalidate the transfer in response to the returned value. The transfer is invalidated when the authorization service does not return the value indicating that the transfer can proceed. Conversely, the transfer is validated when the authorization service returns the value indicating that the transfer can proceed. A transfer can include moving balances from one account to another such as a trade on an exchange or a transfer between participants.

While the examples provided herein describe a token system implemented on the Ethereum blockchain using the ERC-20 standard protocol, the invention is not limited to implementations on Ethereum or to any particular protocol, but may be applied to any decentralized application blockchain platform.

FIG. 1A is a block diagram depicting an exemplary embodiment of a Regulated Token System 100 for securely processing and transferring a token in a distributed chain database 101. The chain database 101 can be a decentralized application blockchain platform (Blockchain) such as the Ethereum blockchain that includes a programming language for generating smart contracts. The Regulated Token System 100 deploys three smart contracts on Blockchain 101: (1) the Regulated Token or R-Token 110, (2) the Registry 120, and (3) the Authorization Service 130. In this embodiment, the R-Token 110 is a general purpose ERC-20 token implementation that overrides standard token transfer functions to consult an on-chain database for trade approval. It is designed to be programmed with simple rules that can be turned off and on in order to maintain regulatory compliance in various jurisdictions around the world. The Regulated Token System 100 is designed to be a flexible standard for issuing regulated securities without code modification, usable by an issuer. As an example and as further detailed below, an issuer might configure rules for enforcing additional trading restrictions or constraints including restrictions on secondary trading based on securities and tax laws.

The Registry 120 is configured to provide a number of functions, including providing a mechanism 122 for locating a current, correct, or desired version of the Authorization Service 130. Thus, Registry 120 provides an ability to control access to a selected authorization service. Here, in response to a service call 112 received from the R-Token 110, Registry 120 is configured to return the address 114 of Authorization Service 130 to which it is currently located.

Trade Approver 150 is a process executed off the Blockchain 101 that provides a mechanism for determining whether a transfer can proceed. A trading participant or investor 175 goes through a Customer Due Diligence (CDD) process 170. In addition, the approval or qualification check can include Know Your Customer (KYC), Anti Money Laundering (AML), and accreditation checks. If the participant or investor is approved, the result is passed to the Trade Approver 150 that can write information at 152 regarding participants or investors to the Authorization Service 130. This approval or qualification check can be updated periodically (e.g., yearly or quarterly) or can be triggered by an event such as every time a token is transferred on a per trade basis.

Additionally, an Issuer 165 can configure R-Token Rules 160 for enforcing additional trading restrictions or constraints. These include, for example, restrictions on secondary trading based on securities and tax laws.

A token holder, investor, or participant Alice 102 may want to transfer a number of tokens to another participant Bob 103. Note that participants 102 and 103 can represent individuals, entities, or accounts. Alice can use the Regulated Token System 100 to securely process and transfer her tokens to Bob by calling or executing a transfer function 105 from an account or wallet, such as an Ethereum wallet or ERC-20 compatible wallet. The transfer function 105 can be the ERC-20 "transfer( )" function, initiated by the token holder and taking a recipient and a value as parameters. For example, if Alice wants to transfer 10 tokens to Bob (or from Alice's account to Bob's account), Bob would be designated as the recipient and 10 would be designated as the value in the transfer function, resulting in a call to "transfer(Bob, 10)." Executing the token contract's transfer function will alter the token contract's balances data structure (a structure that includes Alice's balance of tokens and Bob's balance of tokens) with a revised number of tokens resulting from the transfer of 10 tokens from Alice to Bob or from Alice's account to Bob's account.

Upon receiving the call to transfer, the R-Token 110 asks the Registry 120 via a service call 112 for the address 114 of the Authorization Service 130. In response to the request from R-Token 110, the Registry 120 returns the address 114 for the Authorization Service 130 to which it is currently located, as indicated by 122.

Having identified the current, correct, or desired authorization service, the R-Token 110 calls a check function 116 that receives as parameters a token, a sender, a receiver, and an amount spent, and checks to see via the Authorization Service 130 whether the transaction is valid. The Authorization Service 130 can check its database to determine whether a given participant (e.g., a sender or a receiver) is approved to trade and returns a result 117 to the R-Token 110. The result can return a true/false Boolean value to indicate a success or failure. In particular, the status of a given participant based on the approval or qualification check is written and stored on the Authorization Service 130 by the Trade Approver 150. The status or qualification data may be stored as a Boolean value or code indicating whether a participant is approved to trade. In this way, the various checks such as KYC, AML, and accreditation can be subsumed in a single value. Storing this qualification data on the Blockchain 101 enables the check function to return a result to the R-Token 110 synchronously. Other implementations are possible to implement more complex checks, the details of which are discussed herein.

Figure 1B:
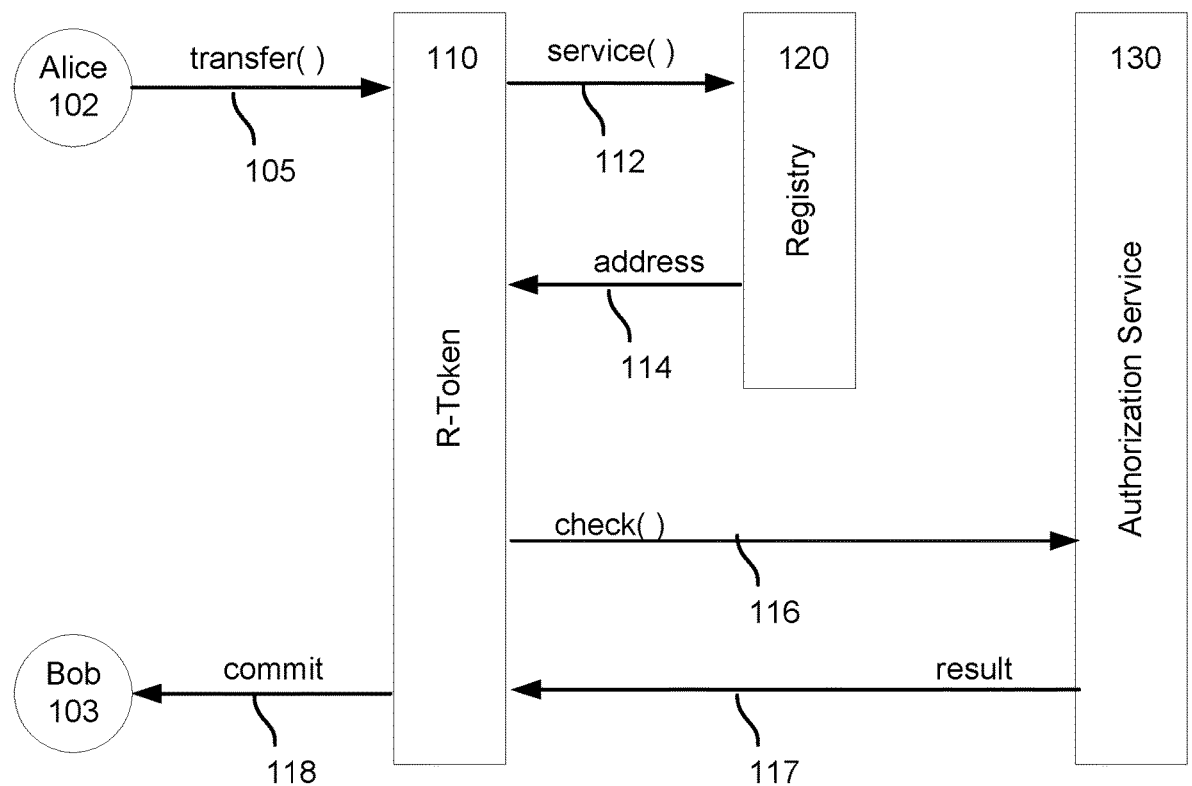
FIG. 1B is a sequence diagram depicting a successful transfer of a token using the system of FIG. 1A.

FIG. 1B is a sequence diagram depicting a successful transfer of a token using the Regulated Token System 100 of FIG. 1A. In this example, a participant Alice 102 wants to transfer tokens to another participant Bob 103. Here, the transfer function 105 is initiated by the token holder, which in this case is Alice, and has a recipient and a value as parameters. If Alice wants to transfer 10 tokens to Bob, Bob is designated as the recipient and 10 is designated as the value, resulting in a call to "transfer(Bob, 10)." Executing the token contract's transfer function alters the token contract's balances data structure (a structure that includes Alice's balance of tokens and Bob's balance of tokens) with a revised number of tokens resulting from the transfer of 10 tokens from Alice to Bob or from Alice's account to Bob's account.

The R-Token 110 receives a valid call to a transfer function 105 from Alice (e.g., "transfer(Bob,10)" to execute a transfer of 10 tokens to Bob), intercepts that call, and routes a check function 116 to an Authorization Service 130 that is executed on a chain database such as Blockchain 101 shown in FIG. 1A. The Authorization Service 130 is identified or selected through Registry 120. In particular, the R-Token makes a request through a service function 112 to Registry 120 and, in response, Registry 120 returns the address 114 of the selected Authorization Service 130. A determination is made in the Authorization Service 130 as to whether the transfer from Alice to Bob is authorized. In particular, the Authorization Service 130 includes a state on the chain database controlled by a Trade Approver 150 process as seen in FIGS. 1A and 1B that is used to validate or invalidate a transfer and returns a value indicating whether the transfer can proceed. The off-chain process is depicted in FIG. 1A and includes the approval and qualification check procedures that make use of the Trade Approver 150 to write the qualification results, including the participant status, to the Authorization Service 130. These qualification results are used by the Authorization Service 130 to return a value indicating whether or not the transfer can proceed. This value is shown in FIG. 1B as the result 117 returned by the Authorization Service 130 to the R-Token 110 in response to check function 116. A determination is made as to whether to validate or invalidate the transfer in response to the returned value. In particular, the transfer is invalidated when the Authorization Service 130 does not return the value indicating that the transfer can proceed. Conversely, the transfer is validated when the Authorization Service 130 returns the value indicating that the transfer can proceed and the transferred token or funds are committed at 118 to Bob. The value can be a Boolean value or code indicating the success or failure of the transfer to be approved.

Typically, the transfer function 105 depicted in FIG. 1A would be called by a token holder who wants to transfer tokens to another participant or to a different account, but this is just one example of a possible transfer function for use in a particular scenario. In another example, a token holder or investor may want to deposit funds or tokens in escrow, also commonly referred to as an allowance data structure, which is the allocation of funds to a mediator to transfer funds or tokens on the investor's behalf.

Figure 1C:
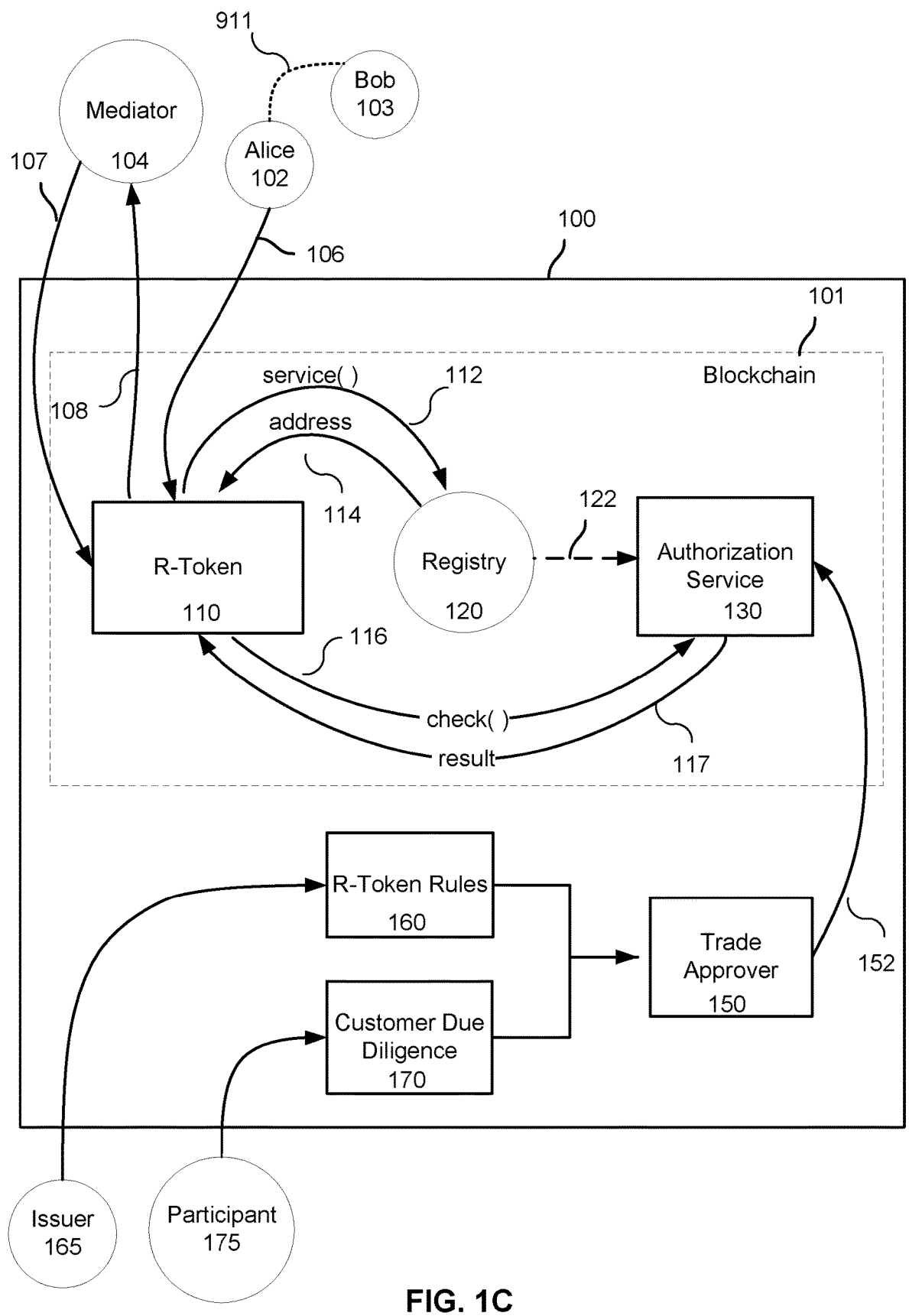
FIG. 1C is a block diagram depicting an exemplary embodiment of a system to securely process and transfer a token in a distributed chain database using a mediator.

FIG. 1C is a block diagram depicting an exemplary embodiment of a Regulated Token System 100 to securely process and transfer a token in a distributed chain database 101, and in particular, illustrates a two-step process for a participant to allocate funds to a mediator to transfer funds or tokens on the participant's behalf.

In this case, a token holder, investor, or participant such as Alice 102 may want to allocate funds to Mediator 104. Note that participant 102 and Mediator 104 can represent individuals, entities, or accounts. Alice can use the Regulated Token System 100 to approve funds to be deposited in escrow, also commonly referred to as an allowance data structure, or to be allocated to Mediator 104 by calling an approve function 106 from an account or wallet such as an Ethereum wallet or ERC-20 compatible wallet. The approve function 106 can be the ERC-20 "approve( )" function, which has a spender and a value as parameters and, when called by a token holder, allows the spender to withdraw from the token holder's account multiple times up to the amount specified by the value. For example, in order to allocate 10 tokens to Mediator 104 to spend on her behalf, Alice can call the function "approve(Mediator, 10)." The allowance data structure will contain the information that Alice has allowed a transfer to Mediator 104 of up to 10 tokens.

As shown in FIG. 1C, if Mediator 104 subsequently wants to transfer tokens from one participant to another or from one account to another, in this case from Alice 102 to Bob 103 or from Alice's account to Bob's account, Mediator 104 would execute transfer function 107. Unlike transfer function 105 in FIGS. 1A and 1B, transfer function 107 is used for a withdraw workflow and is initiated by the approved entity rather than the token holder. This function allows contracts to send tokens on behalf of the token holder, for example, to deposit to a contract address and/or charge fees in sub-currencies. In this example, if Mediator 104 wants to transfer 10 tokens on Alice's behalf from Alice to Bob, Mediator 104 can execute the ERC-20 transfer function "transferFrom(Alice, Bob, 10)" at 108, which designates Alice as the sender, Bob as the recipient, and 10 as the value. Executing the token contract's transfer function 107 will alter the token contract's balances data structure to reflect the result of transferring 10 tokens from Alice to Bob. Similarly, the allowance data structure will be altered to reflect the result of having transferred 10 tokens from Alice to Bob.

On receiving the call to transfer 107 from Mediator 104, the process proceeds as described with respect to FIG. 1A above. R-Token 110 asks Registry 120 via a service call 112 for the address 114 of Authorization Service 130 and, in response, Registry 120 returns the address 114 for the Authorization Service 130 to which it is currently located, represented by 122. Having identified the current, correct, or desired authorization service, R-Token 110 calls a check function 116 that receives as parameters a token, a sender, a receiver, and an amount spent and checks to see via the Authorization Service 130 whether the transaction is valid. The Authorization Service 130 can check its database to determine whether a given participant (e.g., a sender or a receiver) is approved to trade and can return a result 117 to the R-Token 110. The result in this example returns a true/false Boolean value to indicate a success or failure. In particular, the status of a given participant based on the approval or qualification check is written and stored on the Authorization Service 130 by the Trade Approver 150. The status or qualification data may be stored as a Boolean value or code indicating whether a participant is approved to trade. In this way, various checks such as KYC, AML, and accreditation can be subsumed in a single value. Storing this approval status or qualification data on the Blockchain enables the check function to return a result to the R-Token 110 synchronously. Other implementations are possible to conduct more complex checks, the details of which are discussed herein.

Figure 1D:
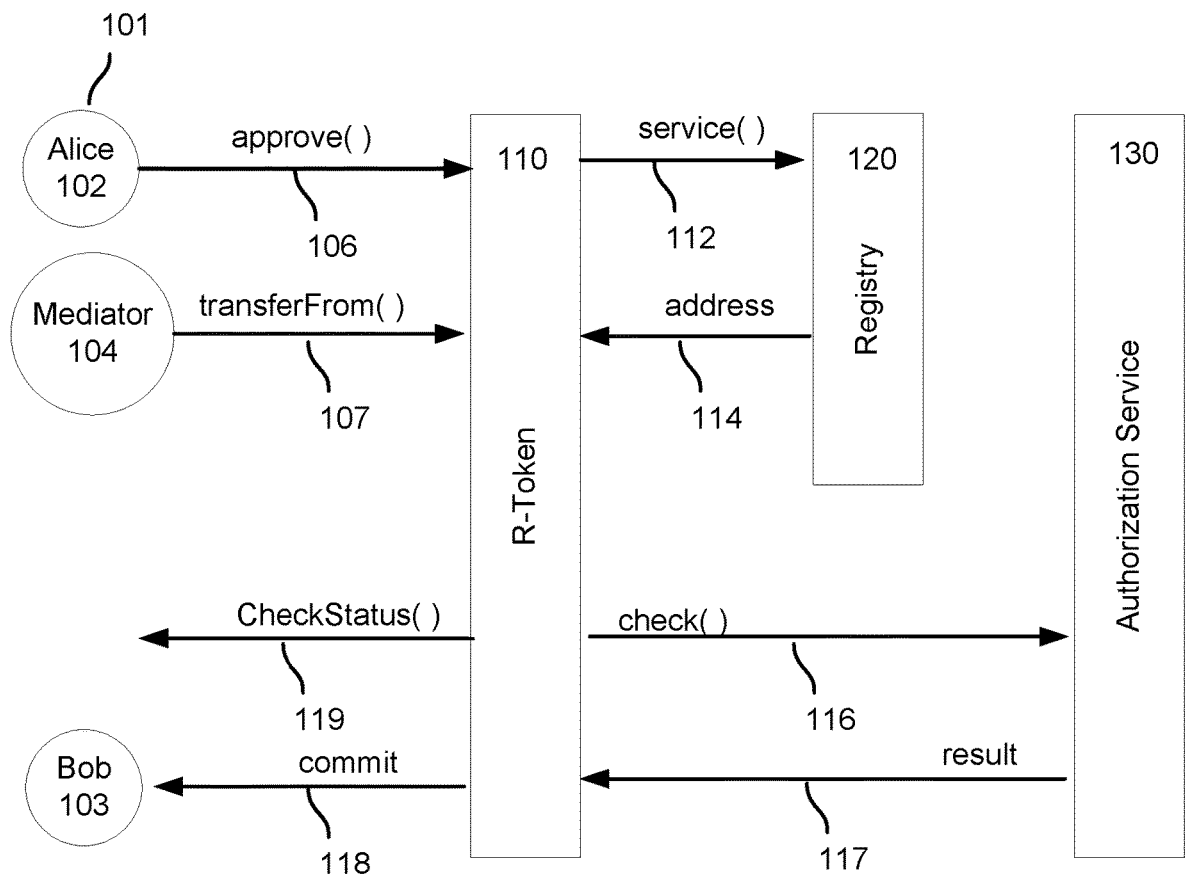
FIG. 1D is a sequence diagram depicting a successful two-step approval and transfer process of a token via a mediator using the system of FIG. 1C.

FIG. 1D is a sequence diagram depicting a successful two-step approval and transfer process of a token via a mediator using the Regulated Token System 100 of FIG. 1C. As described with respect to FIG. 1C, in this case, a participant Alice 102 wants to allocate funds or tokens to Mediator 104 to spend on her behalf. In order to approve and allocate funds or tokens to Mediator 104, Alice can call an approve function 106 on the token contract from an account as specified by ERC-20 using compatible wallet software. The approve function 106 is the ERC-20 "approve( )" function, which has a spender and a value as parameters and, when called by a token holder, allows the spender to withdraw from the token holder's account multiple times up to the amount specified by the value. For example, in order to allocate 10 tokens to Mediator 104 to spend on her behalf, Alice would call the function "approve(Mediator, 10)." The allowance data structure will contain the information that Alice has allowed a transfer to Mediator 104 of up to 10 tokens.

In order to transfer tokens from one participant to another, Mediator 104 executes transfer function 107, which can be used for a withdraw workflow that allows contracts to send tokens on behalf of the token holder. Here, if Mediator 104 wants to transfer 10 tokens on Alice's behalf from Alice to Bob, Mediator 104 can execute the ERC-20 transfer function "transferFrom (Alice, Bob, 10)," which designates Alice as the sender, Bob as the recipient, and 10 as the value. Executing the token contract's transfer function 107 will alter the token contract's balances data structure to reflect the result of transferring 10 tokens from Alice to Bob. Similarly, the allowance data structure will be altered to reflect the result of having transferred 10 tokens from Alice to Bob.

On receiving the call to transfer 107 from Mediator 104, R-Token 110 asks Registry 120 via a service call 112 for the address of Authorization Service 130 and, in response, Registry 120 returns the address 114 for the authorization service to which it is currently located. Having identified the current, correct, or desired authorization service, the R-Token 110 calls a check function 116 that receives as parameters a token, a sender, a receiver, and an amount spent, and checks to see via the Authorization Service 130 whether the transaction is valid. The Authorization Service 130 can check its database to determine whether a given participant (e.g., a sender or a receiver) is approved to trade and can return a result 117 to the R-Token 110. The result in this example returns a true/false Boolean value to indicate a success or failure. In particular, as shown in FIG. 1C, the status of a given participant based on the approval or qualification check is written and stored at 152 on the Authorization Service 130 by the Trade Approver 150. The status or qualification data may be stored as a Boolean value or code indicating whether a participant is approved to trade. In this way, various checks such as KYC, AML, and accreditation can be subsumed in a single value. Storing this qualification data on the Blockchain 101 enables the check function to return a result to the R-Token 110 synchronously. Other implementations are possible to implement more complex checks, the details of which are discussed herein.

Finally, an event 119 called CheckStatus( ) can be triggered by R-Token 110 to send a message to a client's applications with further details as to what happened with respect to the returned result indicating whether a transfer can proceed or not. The message can include result 117, which may be a Boolean value or code indicating true/false. In some embodiments, the message includes a status code and an indicator or reason for why the transfer or trade was not approved (e.g., access denied by Authorization Service 130). The transfer is validated when Authorization Service 130 returns the value indicating that the transfer can proceed and the transferred token or funds are committed at 118 to Bob.

Figure 2:
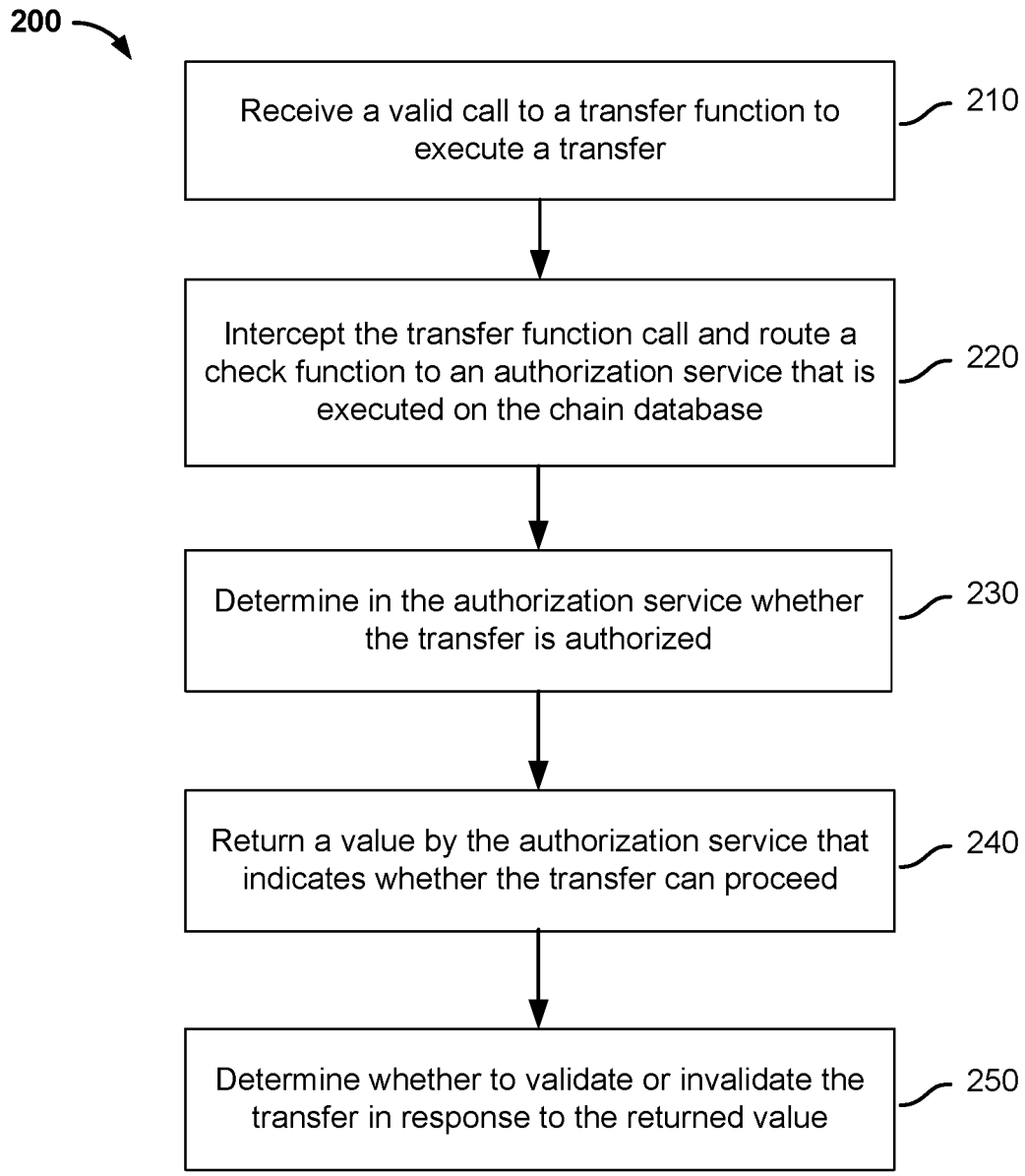
FIG. 2 is a flowchart illustrating an embodiment of a method to securely process and transfer a token in a distributed chain database.

FIG. 2 is a flowchart illustrating an embodiment of a method 200 to securely process and transfer a token in a distributed chain database. First, a valid call to a transfer function to execute a transfer is received at 210. The transfer function can be an ERC-20 transfer function such as "transfer( )" or "transferFrom( )." The transfer function call is intercepted at 220, and a check function is routed to an authorization service, such as Authorization Service 130, that is executed on a chain database, such as Blockchain 101 depicted in FIG. 1A. A determination is made in the Authorization Service at 230 as to whether the transfer is authorized. The authorization service returns a value at 240 that indicates whether the transfer can proceed. A determination is made as to whether to validate or invalidate the transfer in response to the returned value at 250. In particular, if the returned value indicates that the transfer can proceed, the transfer is validated. Conversely, if the returned value indicates that the transfer cannot proceed, or if the authorization service does not return the value indicating that the transfer can proceed, the transfer is invalidated.

Figure 3:
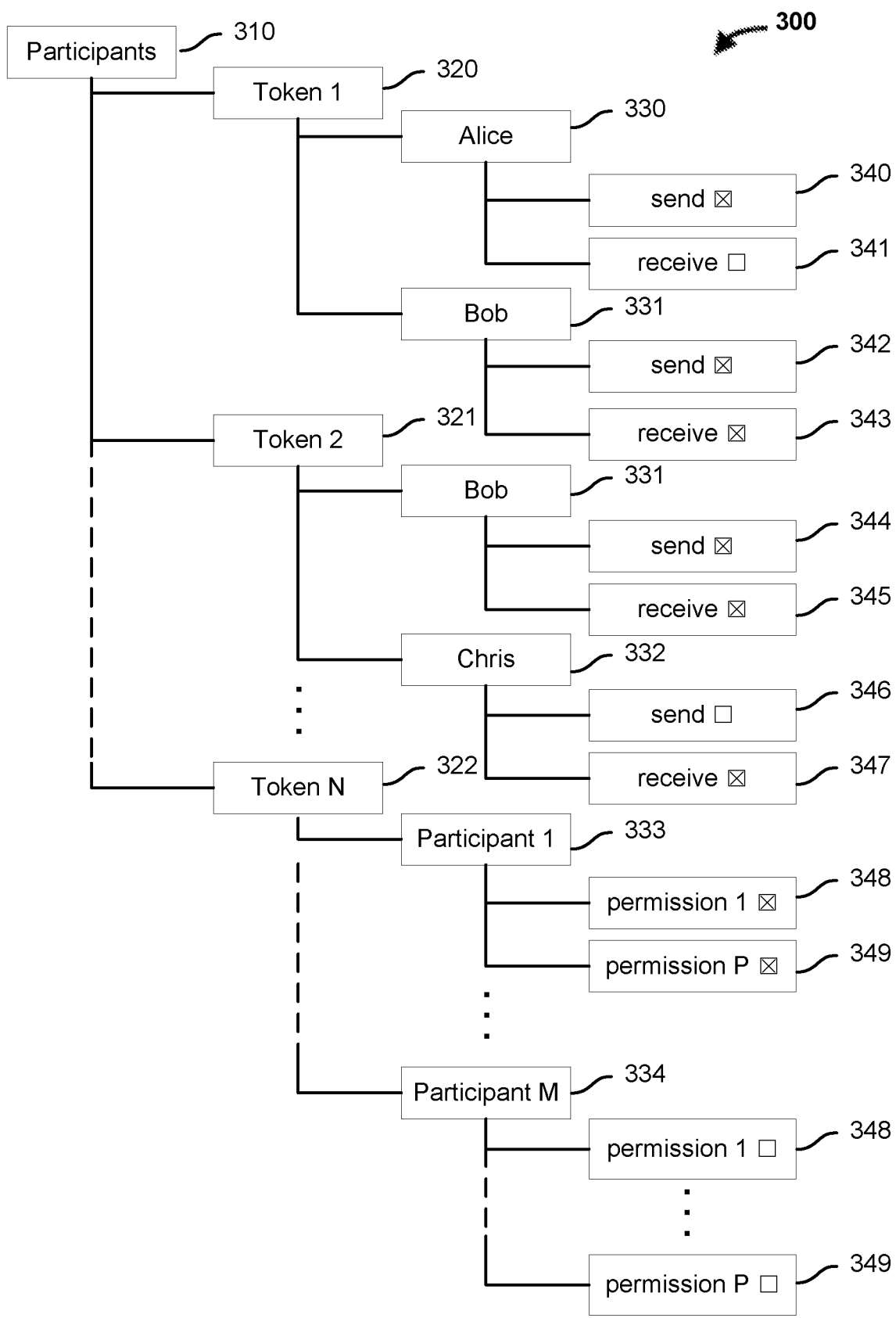
FIGS. 3 and 4 depict a data structure for an exemplary embodiment of a state in the authorization service as described herein.

FIG. 3 depicts a data structure 300 for an exemplary embodiment of a state in the authorization service that is controlled by a trade approver process executed off the chain database. The state can include various parameters, including a setting or a permission that is controlled on a per token basis and that can be applied to a participant of a trade. In addition, changing the state by changing the setting or the permission changes the behavior of the authorization service. For example, as shown in FIG. 3, each token can have set permissions for each participant's ability to send or receive tokens. Token 1 at 320 can be configured for participant Alice 330 to send at 340, as indicated by the checked box, but not receive, as indicated by the unchecked box at 341. Participant Bob 331 can be configured to both send and receive, as indicated by the checked boxes at 342 and 343 respectively. Token 2 at 321 may have participants Bob 331, whose permissions are configured to both send and receive, as indicated by the checked boxes at 344 and 345 respectively, and Chris 332, whose permissions are configured to allow Chris the ability to receive as indicated by the checked box at 347, but not to send, as indicated by the unchecked box at 346. This mechanism can be used to set various different permissions, for example, from permission 1 at 348 through permission P at 349, for any number of tokens up to Token N at 322, and for a given set of participants 310, including, for example, Participant 1 at 333 through Participant M at 334, on a per token and per participant basis. In this example, the permissions to send and receive are indicated by checked boxes. Alternatively, the send and receive parameters can be set to or can return a value, such as a Boolean value, or can use a flag, code, or other indicator to indicate whether the permission is granted or not granted on a per token and per participant basis. In addition, any number of permissions 1-P may be included depending on the application.

Figure 4:
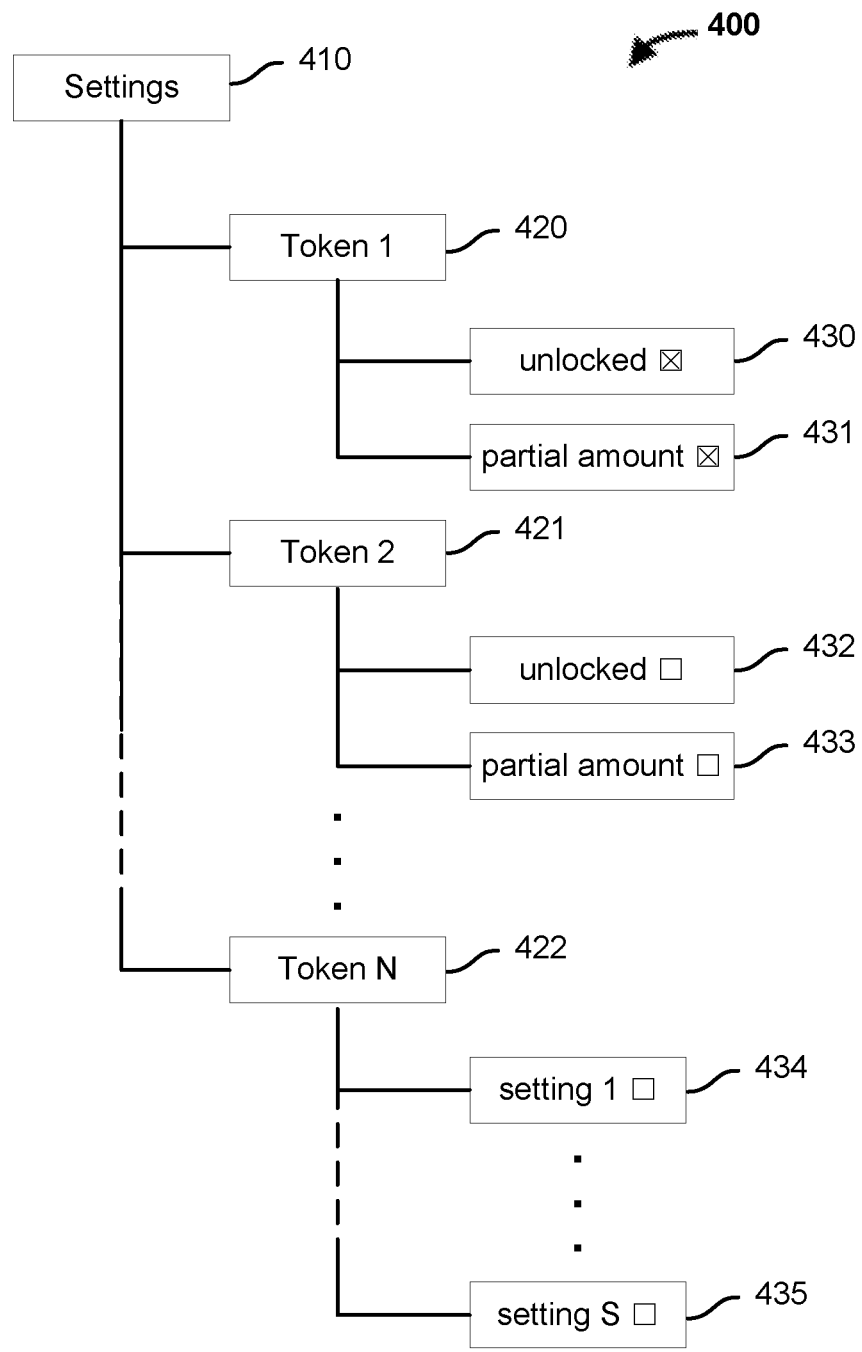

FIG. 4 depicts a data structure 400 for an exemplary embodiment of a state in the authorization service that is controlled by a trade approver process executed off the chain database. As shown in FIG. 4, the state can include a number of parameters, including settings 410, for each token on a per token basis. In particular, the state can include a setting to authorize or deny authorization for a fractional trade and a setting to lock or unlock all trades. For instance, each token can have settings such as whether the token is locked (i.e., prohibited from being transferred) or unlocked and can also designate whether a partial amount is allowed to facilitate fractional transfers. Token 1 at 420 can be set as unlocked as indicated by the checked box at 430, with fractional trading allowed as indicated by the checked box at 431, while Token 2 at 421 can have its own settings that differ from Token 1. For example, Token 2 can be set as locked as indicated by the unchecked box at 432 with fractional trading prohibited as indicated by the unchecked box at 433. This mechanism can be used to designate settings for any number of tokens up to, for instance, Token N at 422 on a per token basis. In this example, the permissions to unlock and allow partial trading are indicated by checked boxes. Alternatively, the unlocked and partial trading parameters can be set to or can return a value, such as Boolean values or codes, to indicate whether the setting is enabled or not enabled. In addition, any number of settings, for example, setting 1 at 434 through setting S at 435, may be included depending on the application.

The data structures depicted in FIGS. 3 and 4 can be used to set parameters that determine the state in the authorization service and thus provide an ability to set permissions and settings for trading on a per token basis. The data structures provide control of the settings and permissions and offer granular control over trading on a per token, per participant level. This feature is useful for various situations that require different permissions for certain participants for any given token. For example, an accredited investor may buy a token at an initial offering when a token is first offered and have both send and receive permissions for that token. If the investor subsequently loses his or her accreditation status, he or she would still be allowed to hold and transfer the token to another account but may no longer be allowed to receive tokens. In this case, the investor's permissions can be changed to reflect the loss of accreditation status to include only send permissions but not receive permissions.

The Registry 120 selects an authorization service. As described above with reference to FIGS. 1A-1D, Registry 120 is configured to identify a current, correct, or desired Authorization Service 130 to the R-Token 110. This is accomplished through a service function call at 112 or request by R-Token 110 followed by a response by Registry 120 returning the address of Authorization Service 130 to which Registry 120 is currently located. But in addition to identifying a selected authorization service, this design also provides a mechanism for updating or replacing one authorization service with an updated or different authorization service that can have a different data structure, logic, or rules. More specifically, a different or updated version of an authorization service may be selected by updating the registry to return the address of the different or updated version of the authorization service in response to the service call from R-Token 110.

Figure 5A:
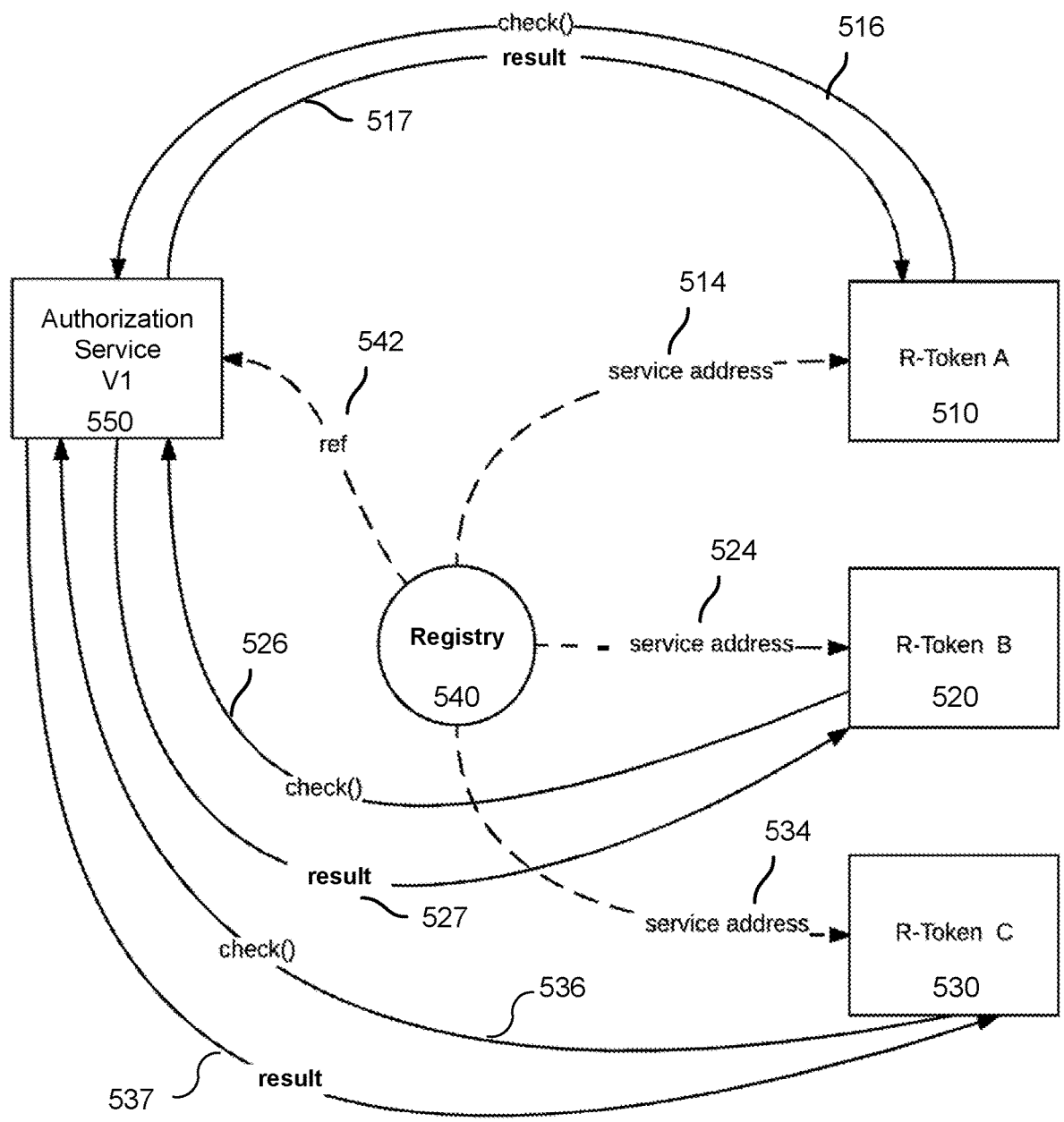
FIGS. 5A-5C are block diagrams depicting an exemplary process for updating an authorization service using a registry as described herein.
Figure 5B:
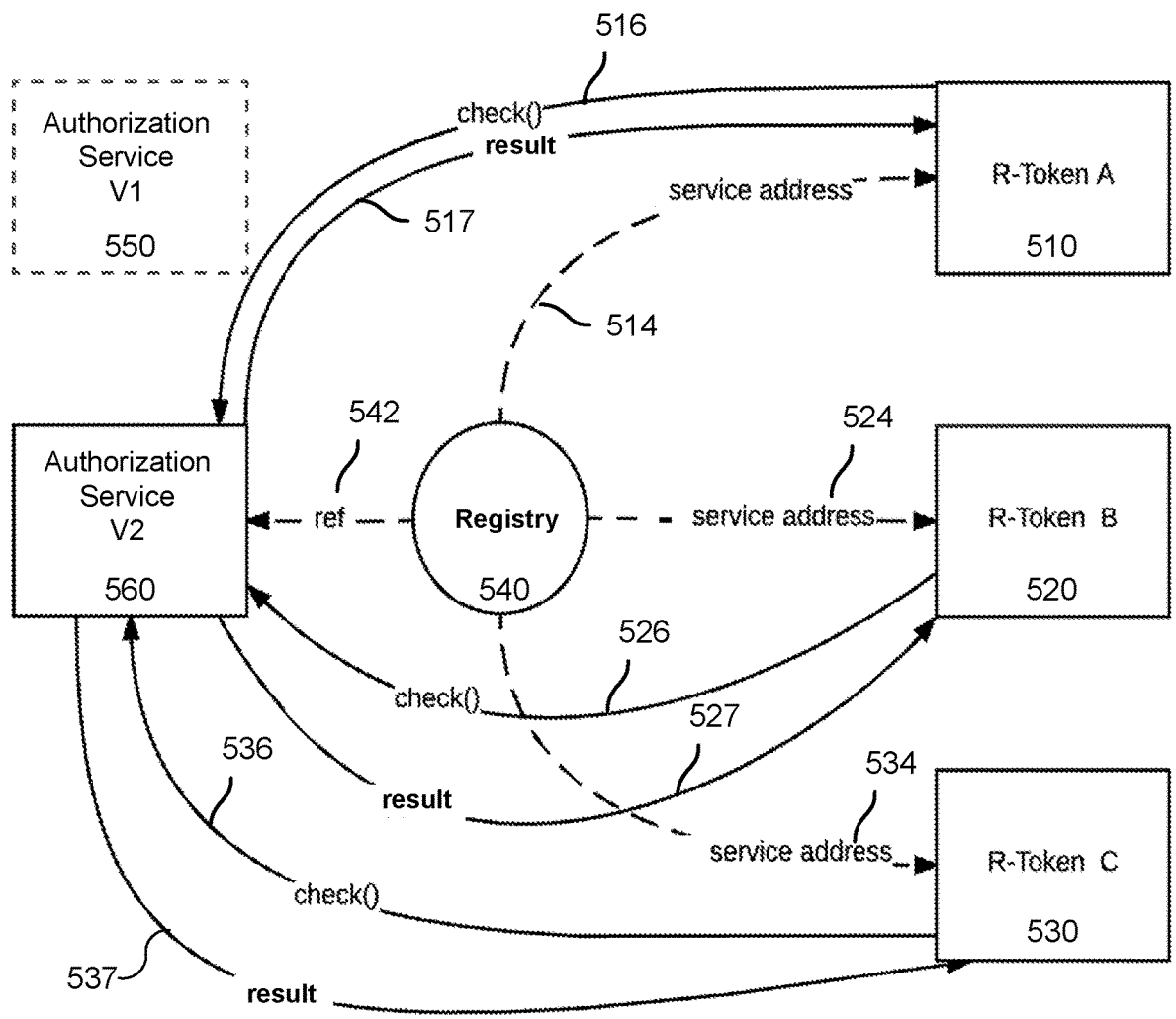
Figure 5C:
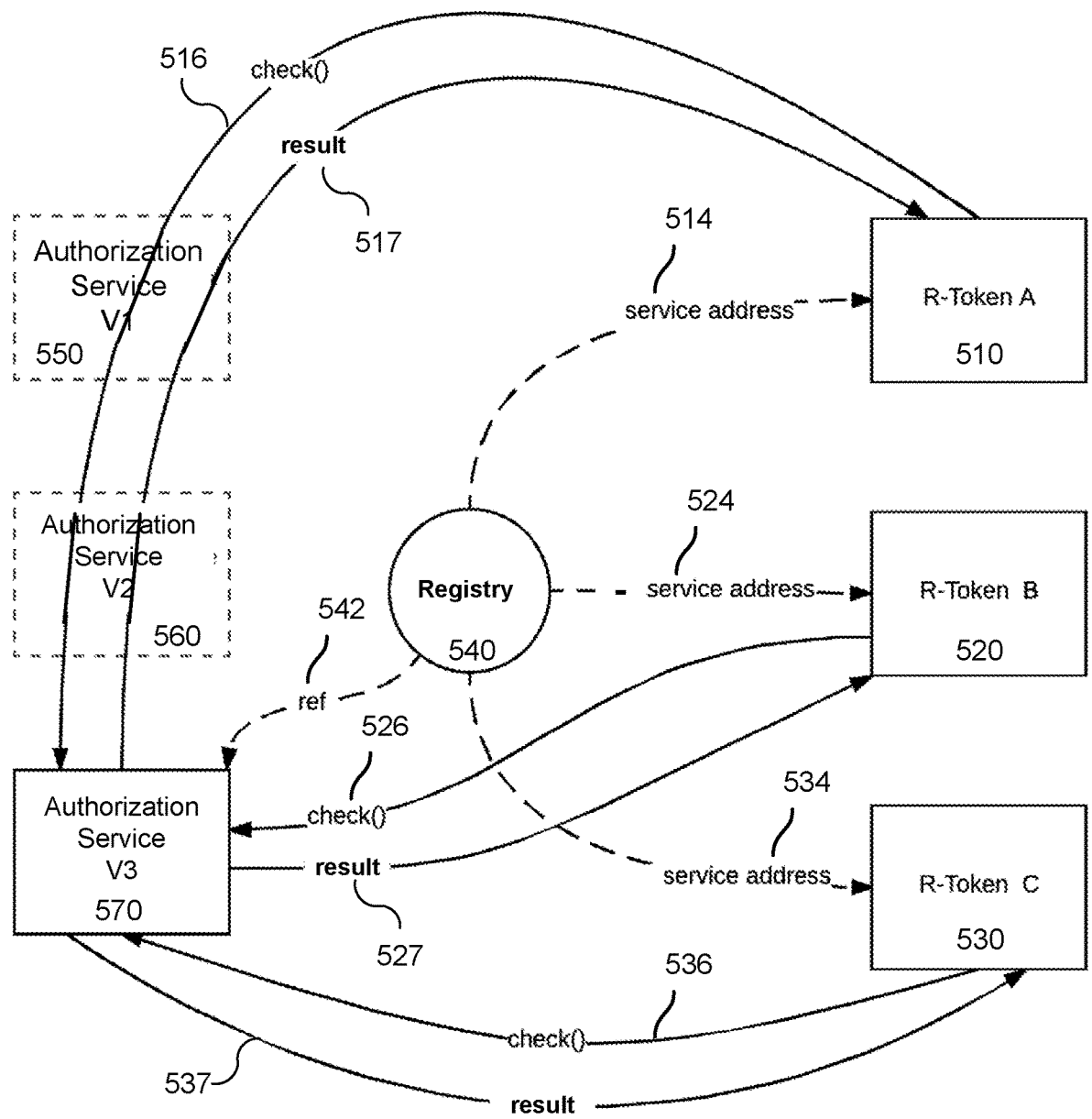

FIGS. 5A-5C are block diagrams depicting an exemplary process for updating an authorization service using a registry. Note that FIGS. 5A-5C show a plurality of R-Tokens, specifically R-Token A at 510, R-Token B at 520, and R-Token C at 530. Each R-Token can request a location to an authorization service via a service call (not shown) to Registry 540 and can receive, in response to the service call, the service address of Authorization Service V1 at 550. Here, R-Token A is shown receiving the service address at 514, R-Token B is shown receiving the service address at 524, and R-Token C is shown receiving the service address at 534. FIG. 5A shows Registry 540 located at Authorization Service V1 at 550, as indicated by a reference location 542. In this case, because Registry 540 is selecting only the Authorization Service V1 at 550, the returned service addresses at 514, 524, and 534 to each R-Token are the same (i.e., the address of Authorization Service V1).

Upon receiving the service address identifying the selected authorization service, in this case Authorization Service V1 at 550, each R-Token can proceed to route a check function to the selected authorization service. Here, R-Token A routes a check function at 516 to Authorization Service V1, R-Token B routes a check function at 526 to Authorization Service V1, and R-Token C routes a check function at 536 to Authorization Service V1. After determining whether the transfer is authorized by accessing an appropriate value stored in its database, Authorization Service V1 returns a result to each R-Token. Here, Authorization Service V1 returns result 517 to R-Token A, result 527 to R-Token B, and result 537 to R-Token C respectively.

In FIG. 5A, Authorization Service V1 is selected by Registry 540 so that when each R-Token makes a request via a service call, Registry 540 returns the service address of Authorization Service V1. FIG. 5B shows how an updated version of the authorization service can be provided by updating the registry to return an address of the updated version of the authorization service in response to the service call.

In FIG. 5B, Registry 540 can switch its reference location 542 to locate a different or an updated version of the authorization service, in this case, Authorization Service V2 at 560. Authorization Service V2 can be configured with a different data structure, can have a different state, and can implement different logic or rules than those configured in Authorization Service V1 at 550. Note that the previous version, Authorization Service V1, is still on the blockchain, but because Registry 540 no longer locates it, it is effectively no longer in use by the R-Tokens in this example. As before, each R-Token can request a location to the currently selected authorization service, now Authorization Service V2, via a service call (not shown) to Registry 540. In response to the service call, Registry 540 returns the service address of Authorization Service V2 at 560. Here, R-Token A is shown receiving the service address at 514, R-Token B is shown receiving the service address at 524, and R-Token C is shown receiving the service address at 534, only this time, Registry 540 locates Authorization Service V2 at 560, as indicated by reference location 542. Consequently, the returned service addresses at 514, 524, and 534 to each R-Token are now the address of Authorization Service V2.

Upon receiving the service address identifying Authorization Service V2, each R-Token can proceed to route a check function to the selected authorization service. Here, R-Token A routes a check function at 516 to Authorization Service V2 at 560, R-Token B routes a check function at 526 to Authorization Service V2 at 560, and R-Token C routes a check function at 536 to Authorization Service V2 at 560. After determining whether the transfer is authorized by accessing an appropriate value stored in its database, Authorization Service V2 returns a result to each R-Token. Here, Authorization Service V2 returns result 517 to R-Token A, result 527 to R-Token B, and result 537 to R-Token C respectively.

The process for updating or switching from one authorization service to another authorization service can be repeated indefinitely. FIG. 5C shows the process repeated in another iteration of updating the authorization service. More specifically, in FIG. 5C, Registry 540 can switch its reference location 542 to locate a different or an updated version of the authorization service, in this case, Authorization Service V3 at 570. Authorization Service V3 can be configured with a different data structure, can have a different state, and can implement different logic or rules than those configured in Authorization Service V1 at 550 and Authorization Service V2 at 560. Note that both of the previous versions, Authorization Service V1 and Authorization Service V2, are still on the blockchain, but because Registry 540 no longer points to either of them, they are effectively no longer in use by the R-Tokens in this example. As described previously, each R-Token can request a location to the currently selected authorization service, now Authorization Service V3, via a service call (not shown) to Registry 540. In response to the service call, Registry 540 returns the service address of Authorization Service V3 at 570. Here, R-Token A is shown receiving the service address at 514, R-Token B is shown receiving the service address at 524, and R-Token C is shown receiving the service address at 534, only this time, Registry 540 locates Authorization Service V3 at 570, as indicated by reference location 542. Consequently, the returned service addresses at 514, 524, and 534 to each R-Token are now the address of Authorization Service V3.

Upon receiving the service address identifying Authorization Service V3 at 570, each R-Token can proceed to route a check function to the selected authorization service. Here, R-Token A routes a check function at 516 to Authorization Service V3 at 570, R-Token B routes a check function at 526 to Authorization Service V3 at 570, and R-Token C routes a check function at 536 to Authorization Service V3 at 570. After determining whether the transfer is authorized by accessing an appropriate value stored in its database, Authorization Service V3 returns a result to each R-Token. Here, Authorization Service V3 returns result 517 to R-Token A, result 527 to R-Token B, and result 537 to R-Token C respectively.

A plurality of authorization services can exist and a registry configured to switch from locating a selected one of the plurality of authorization services to a different one of the plurality of authorization services can exist. The different one of the plurality of authorization services can be an updated version of the selected one of the plurality of authorization services, as shown in FIGS. 5B and 5C, with the registry providing a mechanism for easily updating the authorization service by routing R-Tokens to different authorizations in real time.

Figure 6:
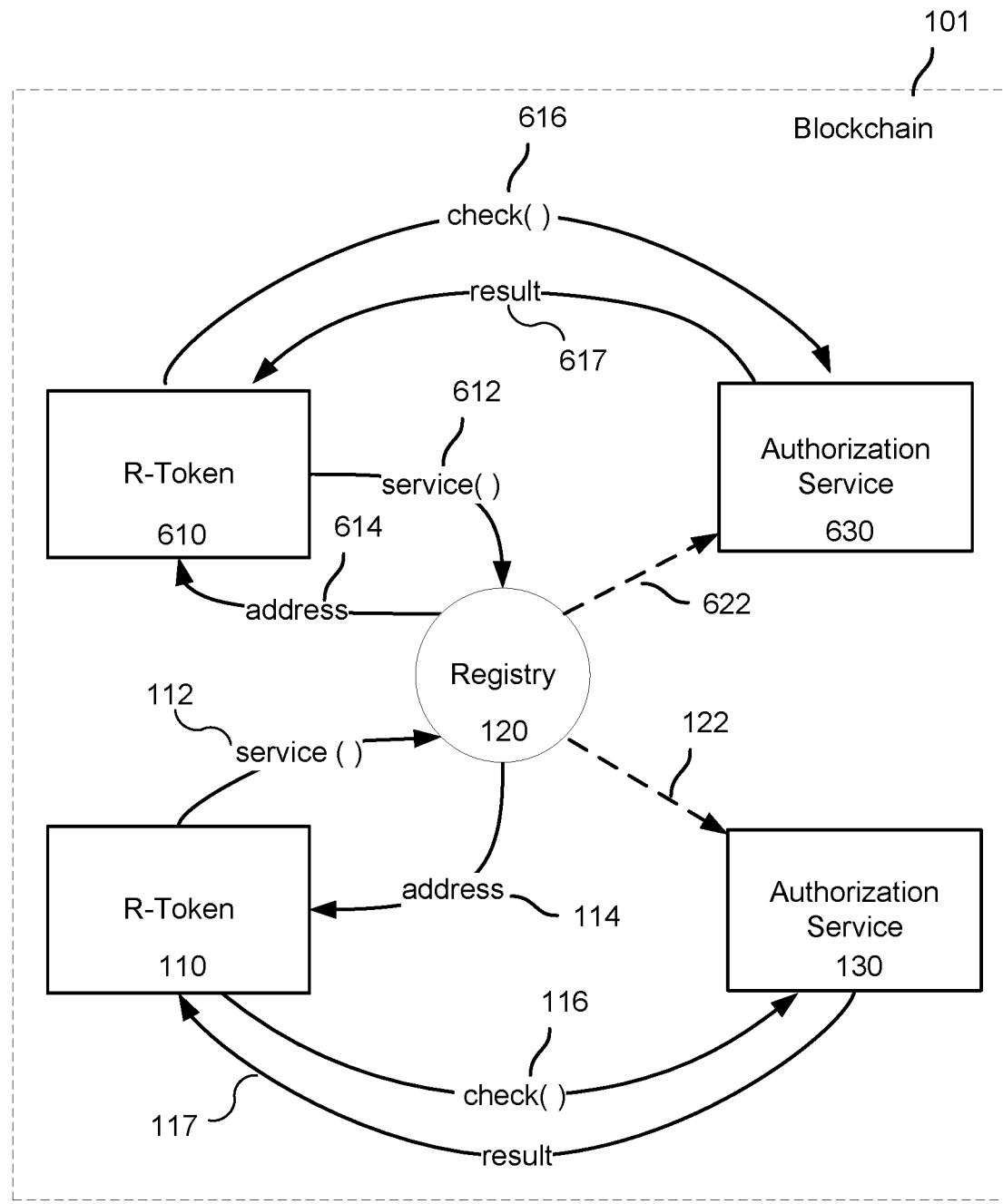
FIG. 6 is a block diagram depicting an exemplary embodiment of a system for securely processing and transferring a token in a distributed chain database having a plurality of R-Tokens and authorization services.

In some embodiments, there can be more than one selected authorization service at a given time, and the registry can be configured to locate and return the addresses of different authorization services to different R-Tokens. FIG. 6 depicts an exemplary embodiment that includes a plurality of R-Tokens and a plurality of authorization services. A registry can be configured to send at least one of the plurality of R-Tokens to a selected one of the plurality of authorization services, and a different one of the plurality of R-Tokens to a different one of the plurality of authorization services. In this example, Registry 120 can be configured to locate an Authorization Service 130 as shown by reference location 122. When R-Token 110 sends a request via a service call 112, in response to the request, Registry 120 returns the address at 114 of Authorization Service 130. Subsequently, R-Token 110 routes a check function at 116 to Authorization Service 130, and after determining whether a transfer can proceed, Authorization Service 130 returns a result at 117 indicating whether the transfer can proceed.

As shown in FIG. 6, Registry 120 can also be configured to locate another Authorization Service 630 as indicated by reference location 622. When another R-Token 610 sends a request via a service call 612, in response to the request, Registry 120 returns the address at 614 of Authorization Service 630. Subsequently, R-Token 610 routes a check function at 616 to Authorization Service 630, and after determining whether a transfer can proceed, Authorization Service 630 returns a result at 617 indicating whether the transfer can proceed.

There are various reasons why the configuration shown in FIG. 6 may be desirable. Different authorization services may have different ownership or be administered by different entities and may provide different features and functionalities. Similarly, different R-Tokens may exist for various types of tokenized assets and, for this reason, it may be advantageous to route different R-Tokens to different authorization services.

In some embodiments, the R-Token, registry, and authorization service can be implemented in a single smart contract, wherein the registry and authorization service functionalities are built into the R-Token itself. In this case, the authorization service can be updated by modifying or updating the R-Token directly.

A system is provided as disclosed herein that securely processes a token in a distributed chain database. The system includes a processor configured to receive a valid call to a transfer function to execute a transfer, intercept the transfer function call, and route a check function to an authorization service that is executed on the chain database. The chain database can be a blockchain, such as for example the Ethereum blockchain, and the processor may include an R-Token or smart contract that is ERC-20 compatible. The authorization service may also be implemented as a smart contract that is ERC-20 compatible. The authorization service is configured to determine whether the transfer is authorized and includes a state controlled by an approver process that is executed off the chain database. The authorization service is also configured to return a value indicating whether the transfer can proceed. The system processor is configured to determine whether to validate or invalidate the transfer in response to the returned value from the authorization service. The processor is configured to invalidate the transfer when the authorization service does not return the value indicating that the transfer can proceed and to validate the transfer when the authorization service returns the value indicating that the transfer can proceed. The system also includes a memory coupled to the processor and configured to provide the processor with instructions.

The state can include a setting or a permission that is controlled on a per token basis, and the memory is further configured to provide the processor with instructions that, when executed, cause the processor to change the state by changing the setting or the permission, wherein changing the state changes the behavior of the authorization service. The state can also include a setting to authorize or deny authorization for a fractional trade, a setting to lock or unlock a trade, or a permission that applies to a participant of a trade.

The system processor can be configured to control access to the authorization service using a registry configured to return an address of the authorization service in response to a service call. Additionally, the system processor can be configured to provide an updated version of the authorization service by updating the registry to return an address of the updated version of the authorization service in response to the service call. Moreover, the authorization service can comprise a plurality of authorization services, and the registry can be configured to switch from locating a selected one of the plurality of authorization services to a different one of the plurality of authorization services. The different one of the plurality of authorization services can be an updated version of the selected one of the plurality of authorization services. The R-Token can also comprise a plurality of R-Tokens, and the registry can be configured to send at least one of the plurality of R-Tokens to a selected one of the plurality of authorization services, and a different one of the plurality of R-Tokens to a different one of the plurality of authorization services.

A computer program product is provided for securely processing a token in a distributed chain database. The computer program product is embodied in a tangible computer readable storage medium and includes computer instructions for receiving a valid call to a transfer function to execute a transfer, intercepts the transfer function call, and routes a check function to an authorization service that is executed on the chain database. The computer program product further includes computer instructions for determining in the authorization service whether the transfer is authorized and for returning a value by the authorization service that indicates whether the transfer can proceed. The authorization service includes a state that is controlled by an approver process that is executed off the chain database. The computer program product also includes computer instructions for determining whether to validate or invalidate the transfer in response to the returned value from the authorization service. In particular, the computer program product includes instructions for invalidating the transfer when the authorization service does not return the value indicating that the transfer can proceed, and validating the transfer when the authorization service returns the value indicating that the transfer can proceed.

The state can include a setting or a permission that is controlled on a per token basis and the computer program product can include computer instructions for changing the state by changing a setting or a permission, wherein changing the state changes the behavior of the authorization service. The state can also include a setting to authorize or deny authorization for a fractional trade, a setting to lock or unlock a transfer, or a permission that applies to a participant of a transfer.

The computer program product can include computer instructions for controlling access to the authorization service using a registry configured to return an address of the authorization service in response to a service call. Additionally, the computer program product can include computer instructions for providing an updated version of the authorization service by updating the registry to return an address of the updated version of the authorization service in response to the service call. Moreover, the authorization service can comprise a plurality of authorization services, and the registry can be configured to switch from locating a selected one of the plurality of authorization services to a different one of the plurality of authorization services. The different one of the plurality of authorization services can be an updated version of the selected one of the plurality of authorization services.

The computer instructions for receiving a valid call to a transfer function to execute a transfer, intercepting the transfer function call, and routing a check function can be implemented on a smart contract or ERC-20 compatible R-Token on a blockchain, such as the Ethereum blockchain. The R-Token can comprise a plurality of R-Tokens, and the registry can be configured to send at least one of the plurality of R-Tokens to a selected one of the plurality of authorization services, and a different one of the plurality of R-Tokens to a different one of the plurality of authorization services. The registry and authorization service can also be implemented as smart contracts on the Ethereum blockchain.

Figure 7:
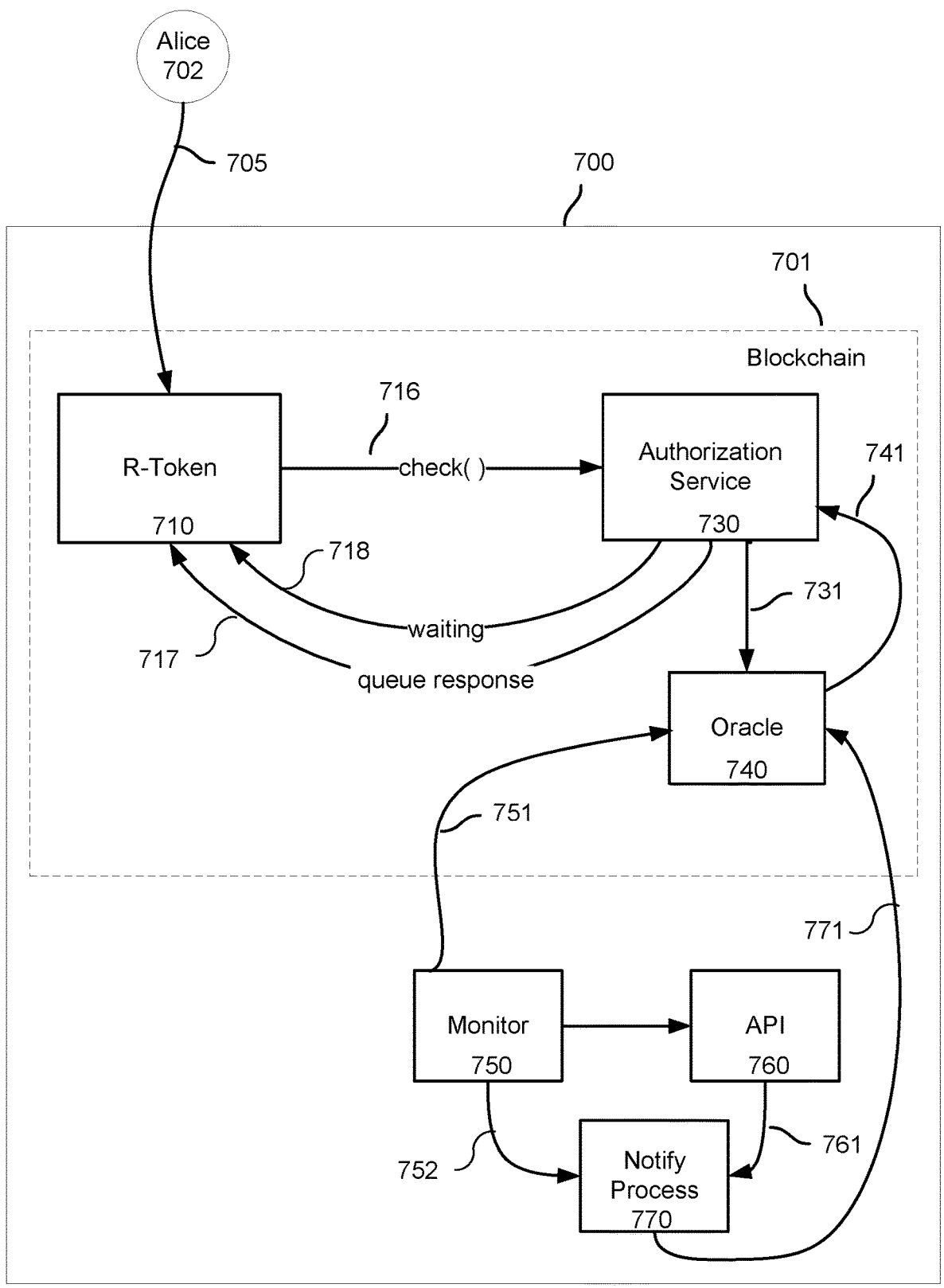
FIG. 7 is a block diagram depicting an exemplary embodiment of a system for securely processing and transferring a token in a distributed chain database using an oracle in an asynchronous process.

FIG. 7 is a block diagram depicting an exemplary embodiment of a system 700 for securely processing and transferring a token in a distributed chain database using an oracle in an asynchronous process. Such a system may be used for performing more complicated checks or for a more complex approval process.

In the example shown in FIG. 7, R-Token 710 receives a valid call 705 to a transfer function to execute a transfer. The call may be received from a token holder, investor, or participant Alice 702 or from Alice's account or wallet. R-Token 710 intercepts the transfer call and routes a check function 716 to Authorization Service 730 that is executed on the chain database, shown here as Blockchain 701. The chain database can be a blockchain, such as the Ethereum blockchain, and the R-Token 710 and Authorization Service 730 can be implemented as smart contracts or ERC-20 compatible tokens.

The authorization service determines whether the transfer is authorized, only in this case, an on-chain oracle is used and the determination occurs asynchronously. Specifically, in response to the check function 716, Authorization Service 730 queues a request at 731 to an on-chain Oracle 740 and returns a queue response 717 and waiting status 718 to R-Token 710. During this waiting period, the funds or tokens for the transfer may be held in escrow. This is to prevent double-spending by the token holder since, by initiating the valid call to the transfer function at 705, the token holder 702 has committed the funds or tokens to the requested transaction if approved. An off-chain process, Monitor 750, constantly checks Oracle 740, monitoring the queue at 751, and can also check for transactions that occur with a particular contract address. Monitor 750 can communicate with Notify Process 770 at 752, or alternatively, an API 760 can communicate with Notify Process 770 at 761. In this example, Notify Process 770 serves a function similar to Trade Approver 150 as described with respect to FIG. 1A above in that it can write information to Blockchain 701. Notify Process 770 can be implemented using an oracle service provider. Notify Process 770 can notify Oracle 740 and can push a result of the notification process at 771 (e.g., a success if the transfer is approved or a failure if it is not approved) to the oracle, in this case Oracle 740, on the chain database. Oracle 740 can then forward the result to Authorization Service 730 directly at 741, which will return a value that indicates whether the transfer can proceed, and the system will determine whether to validate or invalidate the transfer in response to the returned value. Alternatively, Oracle 740 can forward the result (not shown) to R-Token 710, and the system will determine whether to validate or invalidate the transfer in response to the result. Authorization Service 730 can then either commit the funds for the transfer to R-Token 710 if the result is a success, or it can release the escrowed funds back to the original sender if the result is a failure.

A main difference in the example depicted in FIG. 7 as compared with the embodiments described in FIGS. 1A-1D and FIG. 2 is that instead of checking data that has been stored in an authorization service, an oracle is used to perform an on-demand check in real-time or near real-time. This on-demand check happens asynchronously and thus may be performed over the course of more than one block being processed on the blockchain. For instance, during the waiting period which may last over the course of processing one or more blocks, funds or tokens may be placed in escrow, also commonly referred to as an allowance data structure. This means that the funds or tokens are locked, and the token holder or participant who has initiated the transfer cannot attempt to transfer the same funds or tokens again until the current transfer has been resolved (i.e., either executed or not executed). In a subsequent block, Notify Process 770 notifies the Oracle 740 and pushes a result of the notification process at 771, either a success or a failure, to the Oracle. The Oracle can include a state having a parameter with a value indicating the result (i.e., success or failure) allowing the transaction to be completed or denied.

Figure 8A:
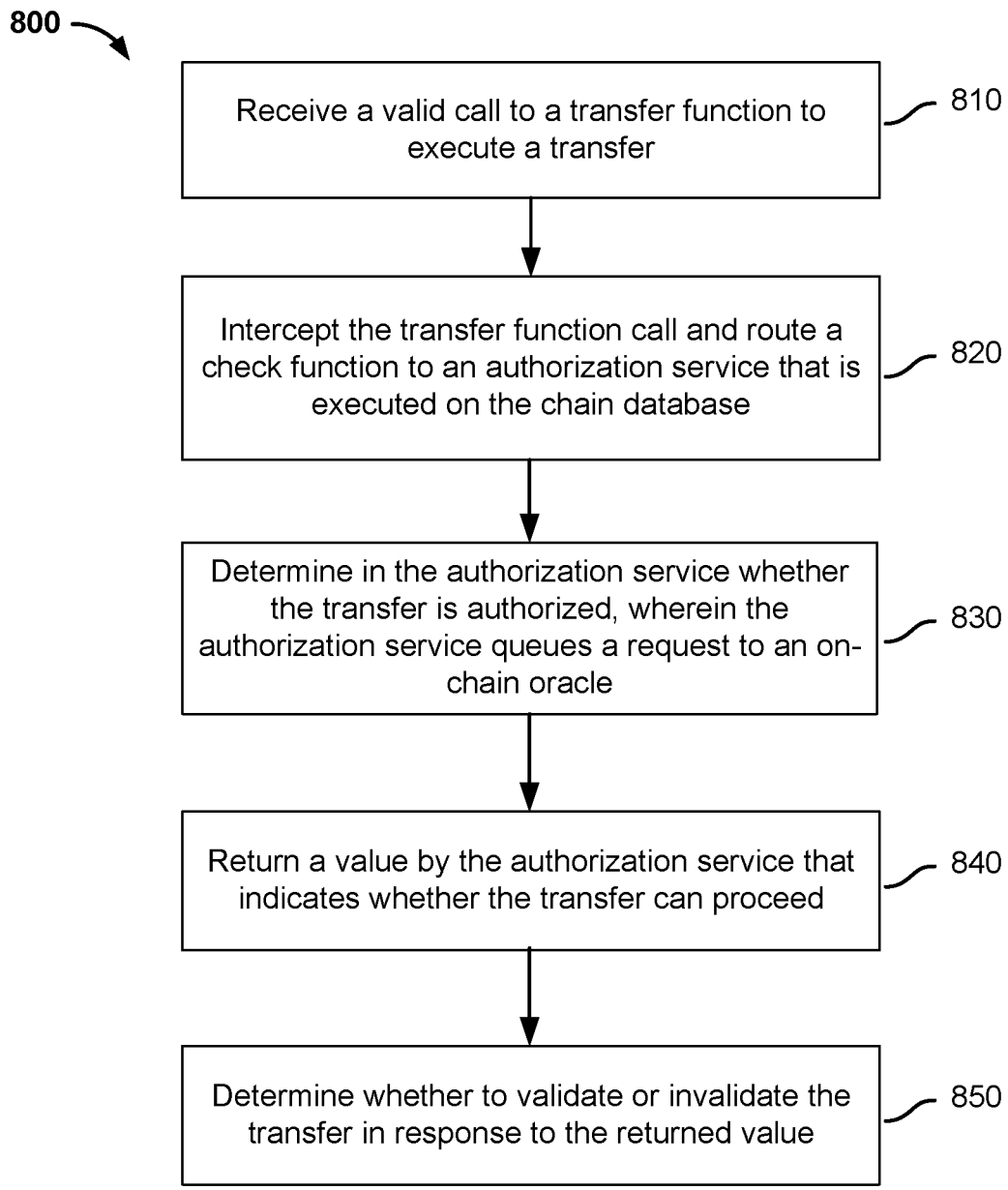
FIG. 8A is a flow chart depicting an exemplary embodiment of a process for securely processing and transferring a token in a distributed chain database using an oracle in an asynchronous process.

FIG. 8A is a flow chart depicting an exemplary embodiment of a process 800 for securely processing and transferring a token in a distributed chain database using an oracle in an asynchronous process. Such a process may be used for performing more complicated checks or for a more complex approval process. First, a valid call to a transfer function to execute a transfer is received at 810. The transfer function call is intercepted at 820 and a check function is routed to an authorization service that is executed on the chain database. At 830, a determination is made in the authorization service as to whether the transfer is authorized. In addition, the authorization service queues a request to an on-chain oracle. A value is returned at 840 by the authorization service that indicates whether the transfer can proceed. At 850, a determination is made as to whether to validate or invalidate the transfer in response to the returned value.

Figure 8B:
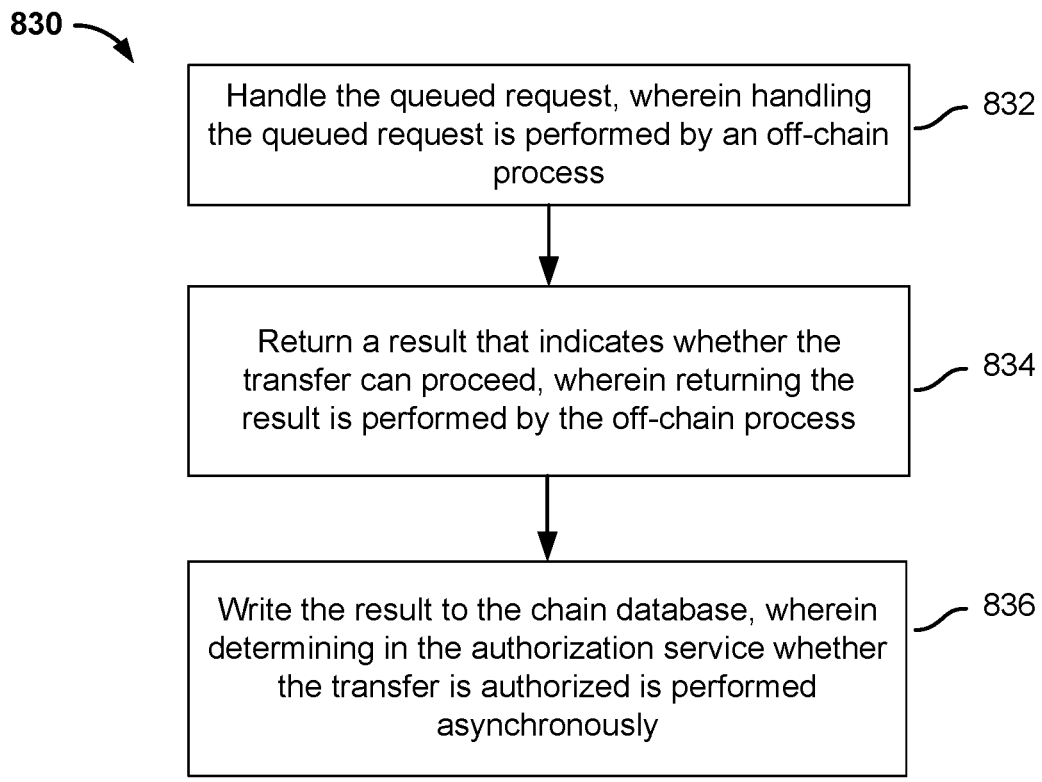
FIG. 8B is a flow chart depicting additional steps in the exemplary embodiment of the process of FIG. 8A.

FIG. 8B is a flow chart depicting additional steps in the exemplary embodiment of process 800 of FIG. 8A. In particular, determining in the authorization service whether the transfer is authorized at 830 can include: handling the queued request by an off-chain process at 832; returning by the off-chain process a result that indicates whether the transfer can proceed at 834; and writing the result to the chain database, wherein determining in the authorization service whether the transfer is authorized is performed asynchronously at 836.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method executed by a computer processor for securely processing a token in a distributed chain database comprising:
   receiving, by the processor and using an R-Token, a first valid call to a first transfer function to execute a first transfer, wherein the first transfer function transfers funds from a transferor to a mediator, wherein the distributed chain database includes the R-token, a registry, and an authorization service, the R-token being a first smart contract, the registry being a second smart contract, the authorization service being a third smart contract;
   upon transferring the funds to the mediator, receiving, by the processor and using the R-Token, a second valid call to a second transfer function to execute a second transfer, wherein the second transfer function transfers funds from the mediator to a transferee;
   in response to the receiving of the second valid call to the second transfer function, routing, by the processor and using the R-Token, a check function to the authorization service that is executed by the processor on the chain database, comprising:
      sending, by the processor, a service call to the registry, wherein the registry is configured to determine an address of the authorization service based on the R-Token, wherein the R-Token corresponds to a first R-Token or a second R-Token, and send the address of the authorization service to the R-Token;
      receiving, by the processor and from the registry, the address of the authorization service in response to the service call; and
      routing, by the processor, using the received address of the authorization service, the check function to the authorization service;
   determining, by the processor using the authorization service, whether the second transfer is authorized, wherein the authorization service includes a state that is controlled by an approver process that is executed off the chain database;
   returning, by the processor, a value by the authorization service that indicates whether the second transfer can proceed;
   determining, by the processor, whether to validate or invalidate the second transfer in response to the returned value; and
   in response to a determination that the second transfer is validated, committing, by the processor, the funds to the transferee.

2. The method of claim 1, further comprising sending a message that includes information as to why the determination was made to validate or invalidate the second transfer.

3. The method of claim 1, wherein the state includes a setting or a permission that is controlled on a per token basis and further comprising changing the state by changing the setting or the permission, wherein changing the state changes behavior of the authorization service.

4. The method of claim 3, wherein the state includes a setting to authorize or deny authorization for a fractional trade.

5. The method of claim 3, wherein the state includes a setting to lock or unlock a trade.

6. The method of claim 3, wherein the state includes a permission that applies to a participant of a trade.

7. The method of claim 1, further comprising providing an updated version of the authorization service by updating the registry to return an address of the updated version of the authorization service in response to the service call.

8. A system for securely processing a token in a distributed chain database, comprising:
   a processor configured to:
      receive, using an R-Token, a first valid call to a first transfer function to execute a first transfer, wherein the first transfer function transfers funds from a transferor to a mediator, wherein the distributed chain database includes the R-token, a registry, and an authorization service, the R-token being a first smart contract, the registry being a second smart contract, the authorization service being a third smart contract;
      upon transferring the the funds to the mediator, receive, using the R-Token, a second valid call to a second transfer function to execute a second transfer, wherein the second transfer function transfers funds from the mediator to a transferee;
      in response to the receiving of the second valid call to the second transfer function, route, using the R-Token, a check function to the authorization service that is executed on the chain database, comprising to:
         send a service call to the registry, wherein the registry is configured to determine an address of the authorization service based on the R-Token, wherein the R-Token corresponds to a first R-Token or a second R-Token, and send the address of the authorization service to the R-Token;
         receive, from the registry, the address of the authorization service in response to the service call; and
         route, using the received address of the authorization service, the check function to the authorization service;
      determine in the authorization service whether the second transfer is authorized, wherein the authorization service includes a state that is controlled by an approver process that is executed off the chain database;
      return a value by the authorization service that indicates whether the second transfer can proceed;
      determine whether to validate or invalidate the second transfer in response to the returned value; and
      in response to a determination that the second transfer is validated, commit the funds to the transferee; and
   a memory coupled to the processor and configured to provide the processor with instructions.

9. The system of claim 8, wherein the state includes a setting or a permission that is controlled on a per token basis and wherein the memory is further configured to provide the processor with instructions that, when executed, cause the processor to change the state by changing the setting or the permission, wherein changing the state changes behavior of the authorization service.

10. A computer program product to be executed by a computer processor for securely processing a token in a distributed chain database, the computer program product being embodied in a tangible non-transitory computer readable storage medium and comprising computer instructions for:

receiving, by the processor and using an R-Token, a first valid call to a first transfer function to execute a first transfer, wherein the first transfer function transfers funds from a transferor to a mediator, wherein the distributed chain database includes the R-token, a registry, and an authorization service, the R-token being a first smart contract, the registry being a second smart contract, the authorization service being a third smart contract;

upon transferring the funds to the mediator, receiving, by the processor and using the R-Token, a second valid call to a second transfer function to execute a second transfer, wherein the second transfer function transfers funds from the mediator to a transferee;

in response to the receiving of the second valid call to the second transfer function, routing, by the processor and using the R-Token, a check function to the authorization service that is executed on the chain database, comprising:

sending, by the processor, a service call to the registry, wherein the registry is configured to determine an address of the authorization service based on the R-Token, wherein the R-Token corresponds to a first R-Token or a second R-Token, and send the address of the authorization service to the R-Token;

receiving, by the processor and from the registry, the address of the authorization service in response to the service call; and routing, by the processor, using the received address of the authorization service, the check function to the authorization service;

determining, by the processor using the authorization service, whether the second transfer is authorized, wherein the authorization service includes a state that is controlled by an approver process that is executed off the chain database;

returning, by the processor, a value by the authorization service that indicates whether the second transfer can proceed;

determining, by the processor, whether to validate or invalidate the second transfer in response to the returned value; and in response to a determination that the second transfer is validated, committing, by the processor, the funds to the transferee.

11. The computer program product of claim 10, wherein the state includes a setting or a permission that is controlled on a per token basis and further comprising computer instructions for changing the state by changing the setting or the permission, wherein changing the state changes behavior of the authorization service.

12. A method executed by a computer processor for securely processing a token in a distributed chain database comprising:

receiving, by the processor and using an R-Token, a first valid call to a first transfer function to execute a first transfer, wherein the first transfer function transfers funds from a transferor to a mediator, wherein the distributed chain database includes the R-token, a registry, and an authorization service, the R-token being a first smart contract, the registry being a second smart contract, the authorization service being a third smart contract;

upon transferring the funds to the mediator, receiving, by the processor and using the R-Token, a second valid call to a second transfer function to execute a second transfer, wherein the second transfer function transfers funds from the mediator to a transferee;

in response to the receiving of the second valid call to the second transfer function, routing, by the processor and using the R-Token, a check function to the authorization service that is executed by the processor on the chain database, comprising:

sending, by the processor, a service call to the registry, wherein the registry is configured to determine an address of the authorization service based on the R-Token, wherein the R-Token corresponds to a first R-Token or a second R-Token, and send the address of the authorization service to the R-Token;

receiving, by the processor and from the registry, the address of the authorization service in response to the service call; and routing, by the processor, using the received address of the authorization service, the check function to the authorization service;

determining, by the processor using the authorization service, whether the second transfer is authorized, wherein the authorization service queues a request to an on-chain oracle;

returning, by the processor, a value by the authorization service that indicates whether the second transfer can proceed;

determining, by the processor, whether to validate or invalidate the second transfer in response to the returned value; and in response to a determination that the second transfer is validated, committing, by the processor, the funds to the transferee.

13. The method of claim 12, further comprising:

handling the queued request by an off-chain process and returning by the off-chain process a result that indicates whether the transfer can proceed; and writing the result to the chain database, wherein determining in the authorization service whether the transfer is authorized is performed asynchronously.

\* \* \* \* \*